United States Patent
Melendez et al.

(10) Patent No.: US 12,055,950 B2
(45) Date of Patent: Aug. 6, 2024

(54) SYSTEMS AND METHODS FOR ENERGY MANAGED AUTOFLIGHT GUIDANCE USING POTENTIAL FLIGHT PATH ANGLE

(71) Applicant: HONEYWELL INTERNATIONAL INC., Morris Plains, NJ (US)

(72) Inventors: Luis Melendez, Scottsdale, AZ (US); Philip Sin, Phoenix, AZ (US); John Koenig, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1031 days.

(21) Appl. No.: 16/990,780

(22) Filed: Aug. 11, 2020

(65) Prior Publication Data

US 2021/0141394 A1 May 13, 2021

Related U.S. Application Data

(60) Provisional application No. 62/900,981, filed on Sep. 16, 2019.

(51) Int. Cl.
*G05D 1/06* (2006.01)
*B64D 31/08* (2006.01)
*G05D 1/00* (2006.01)

(52) U.S. Cl.
CPC ........... *G05D 1/0638* (2013.01); *B64D 31/08* (2013.01)

(58) Field of Classification Search
CPC ..... G05D 1/0638; G05D 1/0607; B64D 31/08
See application file for complete search history.

(56) References Cited

U.S. PATENT DOCUMENTS

| | | | | |
|---|---|---|---|---|
| 6,062,513 A | * | 5/2000 | Lambregts | G05D 1/0638 244/175 |
| 9,815,566 B1 | * | 11/2017 | Innis | B64D 47/00 |
| 10,175,698 B1 | * | 1/2019 | Wyatt | G01C 23/005 |
| 10,691,139 B1 | * | 6/2020 | Perich | B64D 43/02 |
| 2018/0067500 A1 | * | 3/2018 | Kim | B64D 31/06 |
| 2019/0322380 A1 | * | 10/2019 | Roberts | G05D 1/0066 |
| 2020/0002018 A1 | * | 1/2020 | Alaimo, Jr. | B64D 31/06 |
| 2020/0198796 A1 | * | 6/2020 | Melendez | G05D 1/0607 |
| 2021/0065558 A1 | * | 3/2021 | Melendez | G08G 5/0034 |

* cited by examiner

*Primary Examiner* — Masud Ahmed
(74) *Attorney, Agent, or Firm* — Lorenz & Kopf LLP

(57) ABSTRACT

Systems and methods for an energy managed autoflight function that enables maneuvers previously done by the speed-on-elevator modes to be achieved while maintaining the autoflight function in speed-on-throttle mode. An autoflight guidance algorithm and strategy replaces speed-on-elevator modes with an automatic flight path angle (Auto-FPA) mode that can control speed-controlled climbs and descents. The autoflight guidance algorithm and strategy provide (i) autothrust and autoflight coordination during speed-on-throttle modes, (ii) and Auto-FPA control law or mode, (iii) the Auto-FPA control law being configurable for fixed thrust modes, and (iv) a speed protection monitoring scheme.

19 Claims, 5 Drawing Sheets

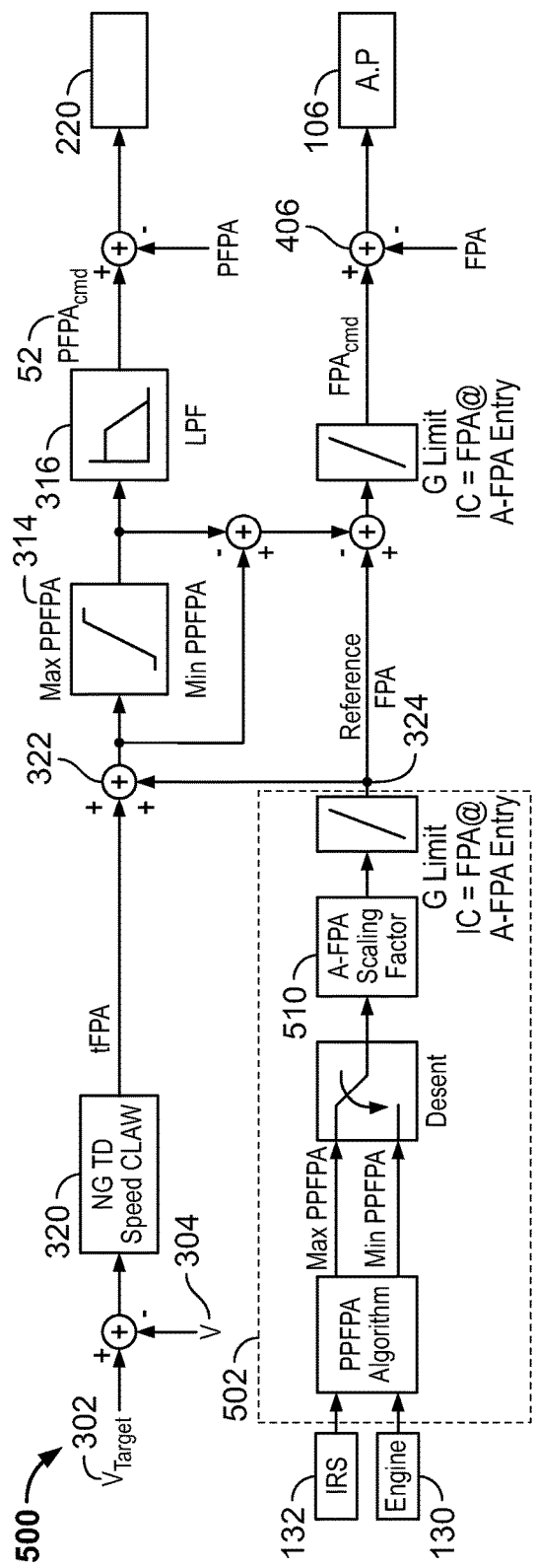
FIG. 5 FIXED THRUST MODE
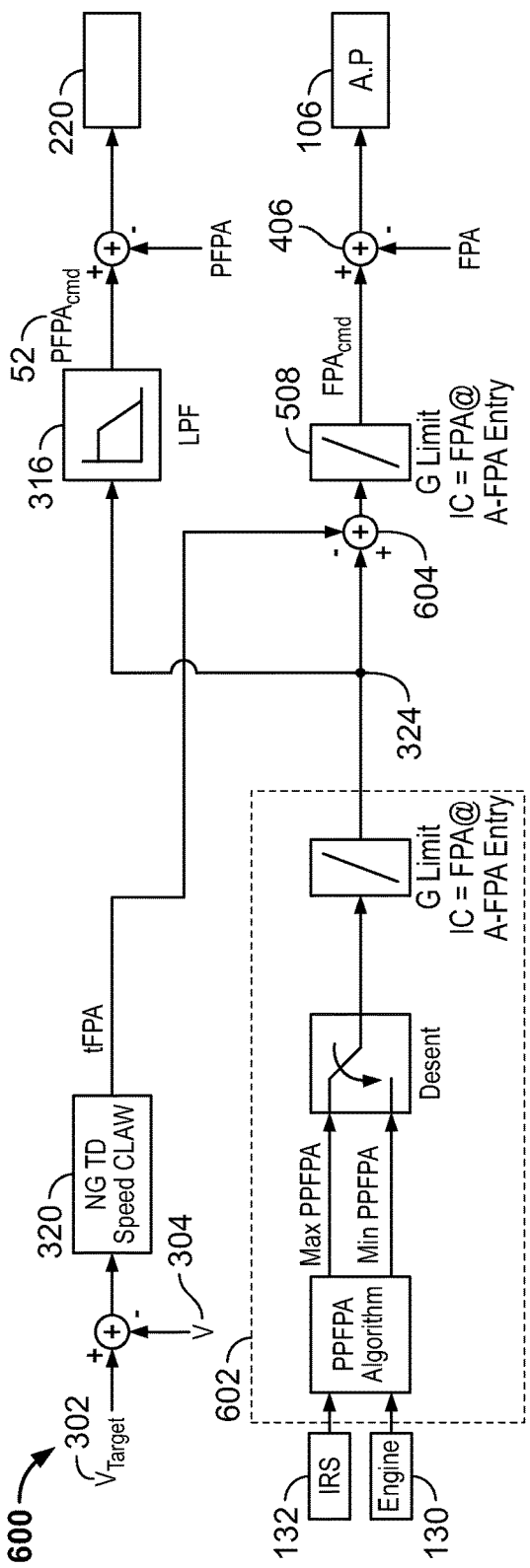
FIG. 6 SPEED ON ELEVATOR

SYSTEMS AND METHODS FOR ENERGY MANAGED AUTOFLIGHT GUIDANCE USING POTENTIAL FLIGHT PATH ANGLE

CROSS-REFERENCE TO RELATED APPLICATION

This application claims the benefit of U.S. Provisional Application No. 62/900,981, filed Sep. 16, 2019.

TECHNICAL FIELD

The present invention generally relates to vehicle guidance systems, and more particularly relates to flight guidance systems and methods for providing autoflight guidance related to flight path angle.

BACKGROUND

Two main components of an automatic flight control system are the autoflight function and the autothrust function. The autoflight function generates lateral and vertical guidance commands based on a mode selection and a target selection. During manual flying, the autoflight function outputs guidance cues on a Primary Flight Display (PFD), and during an automated flight, the autoflight function provides commands to the autopilot system.

The autothrust function generates engine power or throttle commands to control to a selected airspeed or selected thrust target based the autoflight selected mode (also referred to as the active mode). During manual flying, the autothrust function outputs guidance cues on the PFD to set engine power or throttle lever location, and during an automated flight, the autothrust function provides commands to an inner loop autothrottle, which performs a closed loop control on the engine power or throttle position.

Available autoflight implementations employ two modes of operation: speed-on-throttle modes (autoflight controls to a vertical target, autothrust controls speed via throttles) and speed on elevator modes (autothrust controls to a fixed thrust target, autoflight controls speed via elevator). Available flight guidance implementations have limited coordination between the autoflight function and the autothrust function. The function controlling airspeed reacts to the change in airspeed induced by the other function.

Coordinating the active targets for each of the functions in order to ensure continuous energy management is a technical problem to solve. Because each function can drive the other to its operational limits, the automatic adjustment of the targets to maintain the speed-on-throttle control and the automatic selection of max performance climb and descent targets is a technologically challenging problem.

Accordingly, technologically improved systems and methods that provide coordination between autoflight and autothrust functions are desired. Furthermore, other desirable features and characteristics of the present invention will become apparent from the subsequent detailed description of the invention and the appended claims, taken in conjunction with the accompanying drawings and this background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In accordance with exemplary embodiments, a flight control system on an aircraft having an autoflight and autothrust system for receiving and processing a target airspeed and autoflight control mode inputs to automatically manage energy by coordinating autoflight target and autothrust system commands, the system comprising a control module with a processor configured by programming instructions on non-transient computer readable media, the control module configured to: receive a potential flight path angle target (tFPA) from the autothrust system that is based on the target airspeed; receive a vertical target from the autoflight system (rFPA) that is based on the autoflight control mode inputs, the autoflight control mode inputs including a mode selection; generate a potential flight path angle command (PFPAcmd) for use as an active autothrust command based on the rFPA and tFPA; generate an FPA command (FPAcmd) for use as the active autoflight target based on the rFPA; and present the rFPA and the PFPAcmd on a primary flight display.

In accordance with other exemplary embodiments, a method for energy managed flight control on an aircraft having an autoflight and autothrust system, the method comprising: receiving a target airspeed and autoflight control mode inputs including a mode selection; receiving a potential flight path angle target (tFPA) from the autothrust system that is based on the target airspeed; receiving a vertical target from the autoflight system (rFPA) that is based on the autoflight control mode inputs; generate a potential flight path angle command (PFPAcmd) for use as an active autothrust command based on the rFPA and tFPA; generate an FPA command (FPAcmd) for use as the active autoflight target based on the rFPA; and present the rFPA and the PFPAcmd on a primary flight display.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

FIG. 5 is a process flow diagram showing an auto_FPA mode, in accordance with an exemplary embodiment;

FIG. 6 is a process flow diagram showing a fixed thrust mode, in accordance with an exemplary embodiment.

DETAILED DESCRIPTION

Figure 1:
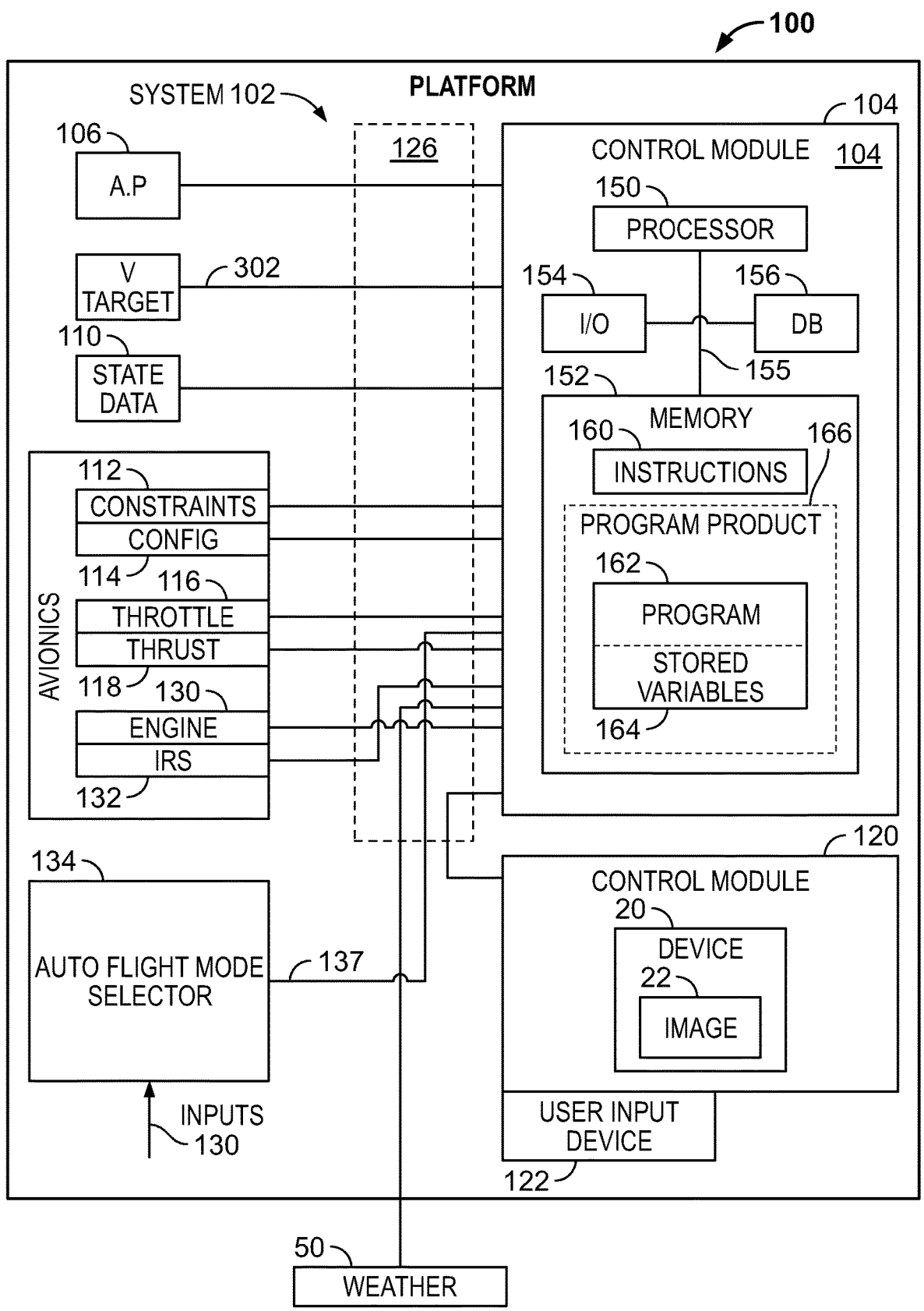
FIG. 1 is a block diagram of a flight control system, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Autoflight functions are generally associated with an autopilot system. As mentioned, common autoflight implementations employ two modes of operation: speed-on-throttle modes (autoflight controls to a vertical target, autothrust controls speed via throttles) and speed on elevator modes (autothrust controls to a fixed thrust target, autoflight controls speed via elevator). Some autoflight implementations perform speed envelop protection by transitioning between speed-on-throttle to speed-on-elevator control. The proposed energy managed autoflight function combines vertical and thrust requests by taking advantage of the relationship between flight path angle (FPA) and potential flight path angle (PFPA) and incorporates predictive potential flight path (PPFPA) limits to the generated commands, such that maneuvers previously done by the speed-on-elevator modes can be achieved while maintaining the function in speed-on-throttle mode. As described in more detail below, exemplary embodiments of a disclosed energy managed autoflight guidance module (FIG. 1, 104, also referred to below as control module 104) employ a novel autoflight guidance algorithm and strategy to replace speed-on-elevator modes with an auto-FPA function that performs speed-controlled climbs and descents in flight path angle mode. The autoflight guidance algorithm and strategy provide (i) autothrust and autoflight coordination during speed-on-throttle modes, (ii) an auto-FPA control law that is configurable for fixed thrust modes, and (iii) a speed protection monitoring scheme. These features and functions are described herein below.

In the described embodiments, the autoflight guidance algorithm is applied in the context of a Primary Flight Display (PFD) providing legacy flight path vector and legacy Flight Path Angle (FPA) Symbols. Although the autoflight guidance algorithm is generally realized as an enhanced aircraft flight deck display system within an aircraft, the concepts presented here can be deployed in a variety of mobile platforms, such as rotorcraft, spacecraft, urban air mobility vehicles (UAM), and the like. Additionally, the provided system and method may be separate from, or integrated within, a preexisting mobile platform management system, electronic flight information system (EFIS) or aircraft flight control system (AFCS).

Turning now to FIG. 1, in an embodiment, the flight control system 102 (also referred to herein as "system" 102) is generally associated with a mobile platform 100. In various embodiments, the mobile platform 100 is an aircraft, and is referred to as aircraft 100. The system 102 embodies a control module 104. Although the control module 104 is shown as an independent functional block, onboard the aircraft 100, in some embodiments, the control module 104 is integrated within a preexisting mobile platform management system, avionics system, cockpit display system (CDS), flight controls system (FCS), or aircraft flight management system (FMS). In some embodiments, the control module 104, user input device 122, and display system 120 are configured as a control display unit (CDU). In other embodiments, the control module 104 may exist in an electronic flight bag (EFB) or portable electronic device (PED), such as a tablet, cellular phone, or the like. In embodiments in which the control module is within an EFB or a PED, the display system 120 and user input device 122 may also be part of the EFB or PED.

The control module 104 may be operationally coupled to any combination of the following aircraft systems, which are generally on-board systems: an autopilot system (AP) 106 which may respond to various autoflight commands; a source of real time (RT) aircraft state data 110; a source of aircraft constraints 112; a source of aircraft configuration data 114, including sensor information and pre-programmed information (equipment settings and weight); a source of a throttle setting, such as an autothrottle system 116; a source of a thrust level setting, such as an autothrust system 118; an engine system 130; an Inertial Reference System (IRS) 132; an autoflight mode selector 134; a display system 120; and, a user input device 122. In various embodiments, a communication system and fabric 126 may reside onboard and serve to communicatively couple various on-board systems and external sources, such as a source of weather data 50, to the control module 104. The functions of these aircraft systems, and their interaction, are described in more detail below.

As used herein, "RT"/"real-time" is interchangeable with current, instantaneous, and actual (as opposed to intended). RT aircraft state data 110 may include any of: an instantaneous location (e.g., the latitude, longitude, orientation), an instantaneous track (also called heading, i.e., the direction the aircraft is traveling in relative to some reference), a RT flight path angle, a RT vertical speed, a RT ground speed (e.g., FIG. 3, actual or measured real time airspeed V 304), a RT instantaneous altitude (or height above ground level), and a current phase of flight of the aircraft 100. In some embodiments, the source of RT aircraft state data 110 is a navigation system, and aircraft state data is sometimes referred to as navigation data. The source of aircraft state data 110 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the RT aircraft state data is made available by way of the communication system and fabric 126, so other components, such as the control module 104 and the display system 120, may further process and/or handle the aircraft state data.

Avionics status data generally includes data that is specific to components and systems of aircraft 100, such as constraints 112, configurations 114, throttle 116, and thrust 118. Constraints 112 may include a pre-programmed starting weight for the aircraft 100; constraints 112 may control onboard systems to provide comfort during flight; constraints 112 may further include look up tables that associate, for all settings of a throttle level angle, an associated engine thrust level. Configurations 114 are sensed RT component and system configurations and/or status for each of various on-board avionics systems; specific to this disclosure, are the current weight (W), and status of aircraft flaps, landing gear position, status of spoilers, status of air brakes, status of flaps, etc.; and, at any given time, their collective (i.e., combined) status or settings may be referred to as RT aircraft configuration data. Throttle settings 116 provides a current throttle setting, inclusive of a throttle level angle (TLA). Thrust 118 provides a current thrust (T) level, generally in a range from idle to maximum. During operation, the components of avionics status data self-report or provide respective real-time (RT) performance data and sensed data for further processing. Therefore, a thrust level (T), weight (W), and throttle level angle (TLA) are continually updated for further processing.

The autoflight mode selector 134 receives and responds to a plurality of autoflight control mode inputs 136. Examples of the control mode inputs 136 include a target altitude, target ground speed ($V_{target}$ 302), target heading, and target vertical speed or target flight path angle (FPA). Note that either a target vertical speed such as 2000 feet per minute or a target FPA, such as three degrees, can achieve the same result. Other examples of user input include "hold altitude," "descend at three degrees," "fly at 200 Knots," and the like. In various embodiments, each of the control mode inputs 136 may be manually provided via a user input device 122. In other embodiments, each of the control mode inputs 136 may be provided by a flight management system (FMS), in communication with a navigation database. The autoflight mode selector converts the control mode inputs 136 into targets 137 that are input to one or more control law algorithms (FIG. 4, 408) to generate a desired flight path angle dFPA for each respective target 137.

A source of weather data 50 provides current weather conditions. Some weather conditions, such as wind, effect airspeed, and are utilized by the control module 104.

In various embodiments, communication between aircraft 100 subsystems is managed by a communication system and fabric 126. The communication system and fabric 126 is configured to support instantaneous (i.e., real time or current) communications between onboard systems (i.e., the navigation system, the navigation database, the various avionics systems, the FMS), the control module 104, and one or more external data source(s) 122. As a functional block, the communication system and fabric 126 may represent one or more transmitters, receivers, and the supporting communications hardware and software required for components of the system 102 to communicate as described herein. In various embodiments, the communication system and fabric 126 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communication system and fabric 126 also support controller pilot data link communications (CPDLC), such as through an aircraft communication addressing and reporting system (ACARS) router; in various embodiments, this feature may be referred to as a communications management unit (CMU) or communications management function (CMF). In summary, the communication system and fabric 126 may allow the aircraft 100 and the control module 104 to receive information that would otherwise be unavailable to the pilot and/or co-pilot using only the onboard systems.

The user input device 122 and the control module 104 are cooperatively configured to allow a user (e.g., a pilot, co-pilot, or crew member) to interact with display devices 20 in the display system 120 and/or other elements of the system 102, as described in greater detail below. Depending on the embodiment, the user input device 122 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 122 is configured as a touchpad or touchscreen, it may be integrated with the display system 120. As used herein, the user input device 122 may be used to modify or upload the program product 166, override the program when it's running, etc. In various embodiments, the display system 120 and user input device 122 are onboard the aircraft 100 and are also operationally coupled to the communication system and fabric 126.

In various embodiments, the processor 150, alone, or as part of a central management computer (CMS) or a flight management system (FMS), loads instructions 160 to thereby be programmed with instructions 160. During operation of the control module 104, the processor 150 executes instructions 160, and draws upon input data and information to perform the functions and operations attributed to the control module 104, as described herein, providing real-time flight guidance for aircraft 100. The real time flight guidance may be provided to a user by way of graphics and commands for the display system 120, an audio system, or the like. For example, the control module 104 may compare an instantaneous (current) position and heading of the aircraft 100 with the prescribed or intended flight plan data for the aircraft 100 and generate display commands to render images 22 distinguishing these features. The control module 104 may further associate a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the weather data 50.

The control module 104 generates display commands for the display system 120 to cause the display device 20 to render thereon the image 22, comprising various graphical user interface elements, tables, icons, alerts, menus, buttons, and pictorial images, as described herein. The display system 120 is configured to continuously receive and process the display commands from the control module 104. The display system 120 includes a display device 20 for presenting a rendered video or image 22. In various embodiments described herein, the display system 120 includes a synthetic vision system (SVS), and the image 22 is an SVS image. In exemplary embodiments, the display device 20 is realized on one or more electronic display devices configured as any combination of: a head up display (HUD), an alphanumeric display, a vertical situation display (VSD) and a lateral navigation display (ND).

Renderings on the display system 120 may be processed by a graphics system, components of which may be integrated into the display system 120 and/or be integrated within the control module 104. Display methods include various types of computer-generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 may be said to display various images and selectable options described herein. In practice, this may mean that the control module 104 generates display commands, and, responsive to receiving the display commands from the control module 104, the display system 120 displays, renders, or otherwise visually conveys on the display device 20, the graphical images associated with operation of the aircraft 100, and specifically, the graphical images as directed by the control module 104.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Information in the memory 152 may be organized and/or imported from an external data source during an initialization step of a process; it may also be programmed via a user input device 122. In some embodiments, the database 156 is part of the memory 152. In some embodiments, instructions 160, program 162, and stored variables 164 are pre-loaded into the memory 152 or the database 156, and are, therefore, internal to the control module 104.

The program 162 includes the previously described autoflight guidance algorithm and the various control laws described herein comprising rules and instructions which, when executed, convert the processor 150/memory 152/database 156 configuration into the control module 104 that performs the functions, techniques, and processing tasks attributed to the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 126. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 126 and obtains data from external data source(s) directly. Also, in various embodiments, the I/O interface 154 may support communication with technicians, and/or one or more storage interfaces for direct connection to storage apparatuses, such as the database 156.

As mentioned, flight path based Primary Flight Displays (PFDs) promote easy recognition of whether the aircraft is climbing or descending. When an FPA cue is positioned above the horizon, the aircraft is climbing, and when the FPA cue is positioned below the horizon, the aircraft is descending. The addition of a Potential Flight Path Angle (PFPA) cue to the PFD, as disclosed in Wyatt, et al, U.S. patent application publication Ser. No. 15/700,416, "AUTOMATIC FLIGHT CONTROL SYSTEMS AND METHODS") has improved a pilot's recognition of the aircraft's current energy state. PFPA cue above/below the FPA cue indicates that the aircraft is accelerating/decelerating, respectively, along its current flight path or trajectory.

Figure 2:
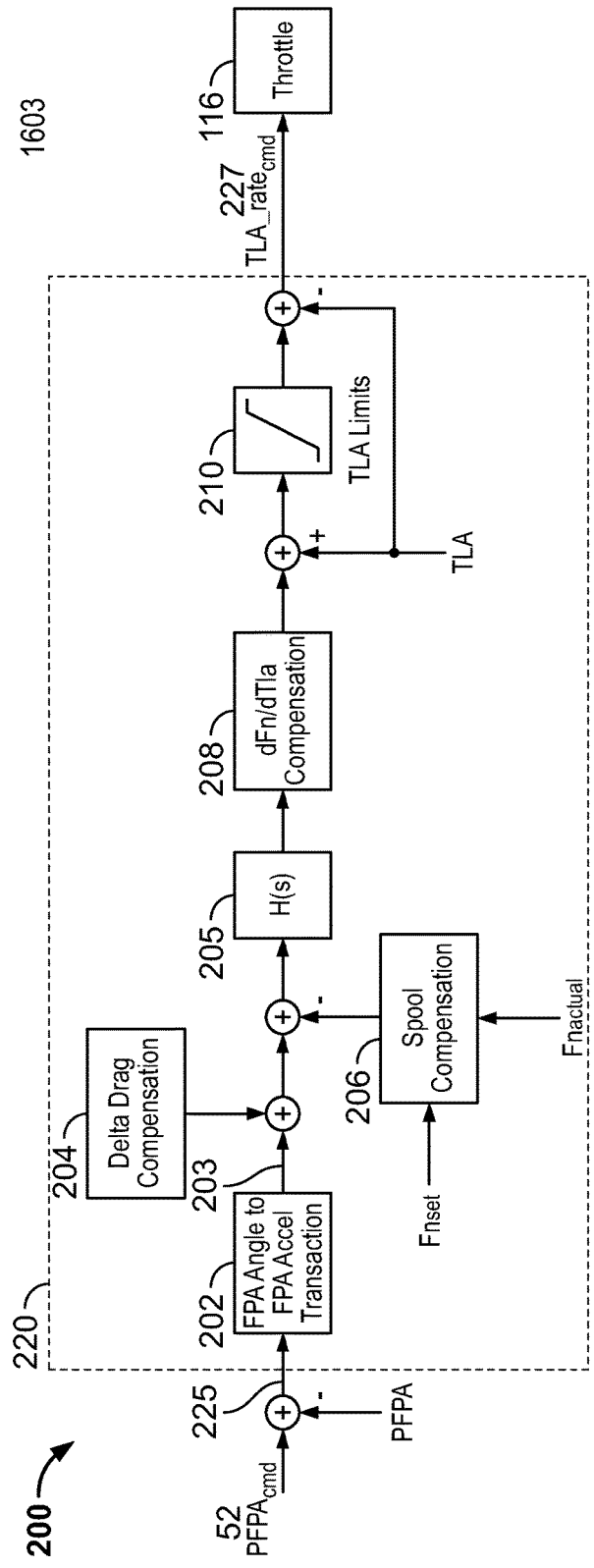
FIG. 2 is a process flow diagram for an inner loop auto-throttle control algorithm, in accordance with an exemplary embodiment.
Figure 3:
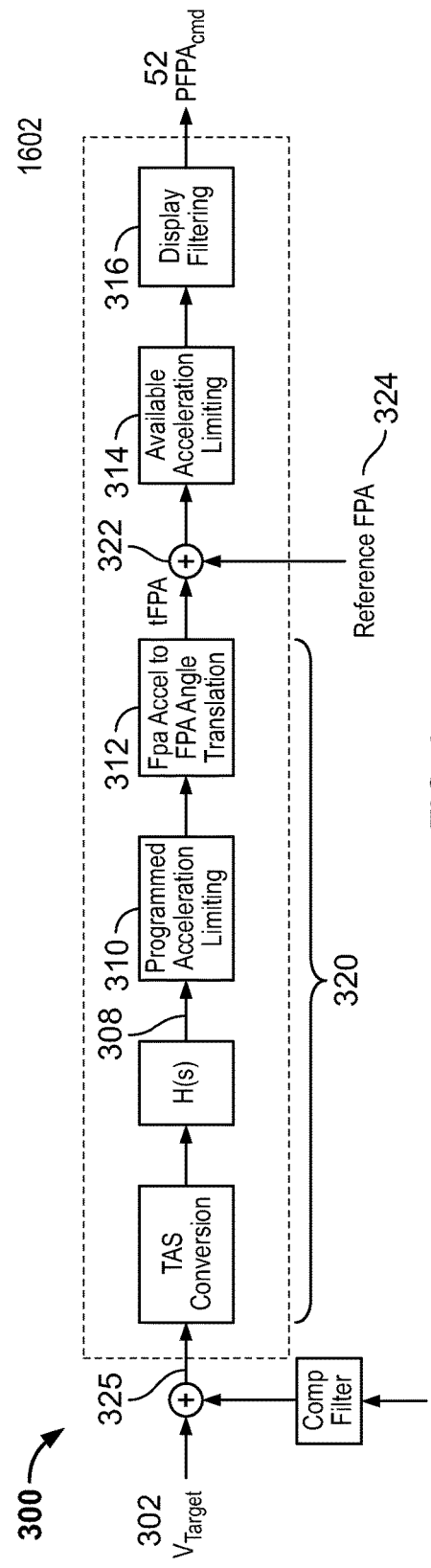
FIG. 3 is a process flow diagram for a thrust guidance control algorithm, in accordance with an exemplary embodiment.

The proposed autoflight guidance algorithm converts an available flight control system into an enhanced flight control system 102 using potential flight path for energy management, and other technological improvements over available flight guidance systems. The proposed autoflight guidance algorithm builds upon previously described building blocks. The description in connection with FIG. 2 is a review of potential flight path based inner loop autothrottle building block introduced in provisional application Ser. No. 62/782,841, entitled SYSTEMS AND METHODS FOR PROVIDING DELTA THROTTLE GUIDANCE USING FLIGHT PATH ACCELERATION, and incorporated herein by reference. The description in connection with FIG. 3 is a review of a thrust guidance building block introduced in provisional application Ser. No. 62/781,785 titled, SYSTEMS AND METHODS FOR PROVIDING THRUST GUIDANCE RELATED TO FLIGHT PATH ANGLE and incorporated herein by reference.

Moving to FIG. 2, the data flow diagram 200 for an inner loop auto-throttle control law/algorithm is shown, receiving as an input the potential flight path angle command, $PFPA_{cmd}$ 52. The $PFPA_{cmd}$ 52 is defined as a function of a flight path acceleration along the flight path trajectory, $a_{FPA}$ (also referred to as a flight path vector). In an embodiment, the source of the $PFPA_{cmd}$ 52 may be an outer loop controller (as is described in connection with FIG. 3) that tracks speed or thrust. In an embodiment, the source of the $PFPA_{cmd}$ 52 may be a manual interface to the pilot. The elements enclosed in a dashed line are referred to below as autothrottle (AT) Inner Loop Control Law 220.

Maintaining a target flight path acceleration by adjusting a current throttle angle (TLA) or throttle rate, as only a function of flight path acceleration error (i.e., supplying PFPA error 225 at 203), would result in an inner loop auto-throttle response that is just reactionary, and not capable of anticipating throttle adjustments during maneuvers, configuration changes, engine spool effects or non-linearities of the throttle-to-engine response. Thus, the building block embodied as autothrottle (AT) Inner Loop Control Law 220 data flow advantageously employs the following compensation terms to provide the desired anticipation adjustments:

Delta Drag Compensation: When a turn is initiated or when the aircraft configuration is changed, the drag of the aircraft is affected, thus requiring adjustment to the thrust being applied to maintain the flight path acceleration. Accordingly, the delta drag compensation 204 term estimates the amount of delta drag that will occur when either the aircraft configuration changes or during a maneuver on another axis (i.e. roll, flight path). The delta drag compensation 204 uses inputs such as the flaps/gear handles (from aircraft configurations 114) and the Flight Director Commands (when applicable) to inject an additional acceleration request to offset/cancel these impacts and minimize the transient on the desired potential flight path.

Spool Compensation: The engine spool has the effect of causing undesired overshoots/undershoots in the capture of a potential flight path target due to a delayed response of the acceleration (thrust 118) to a throttle change, this is also referred to as the spool effect. The Spool Compensation 206 term monitors the difference between the actual thrust 118 and steady state thrust to enable the control law to cancel out the spool effect.

Delta Thrust to Delta TLA Compensation: Most Engines exhibit non-linear behavior throughout the throttle 116 travel region. This translates into differing delta thrust 118 values for the same delta throttle 116, as a function of throttle travel region. The Delta Thrust to Delta TLA compensation 208 utilizes a throttle-to-thrust curve to linearize this relationship, which allows the inner loop control law to normalize the thrust command based on the throttle location.

Throttle Limiting 210: On commonly available auto-throttles, limiting the throttles 116 to the allowed engine-power ratings is done during an engine-power command to throttle command translation. In contrast, in the provided inner loop control law 220 data flow, the engine-power limits are either converted directly into equivalent TLA positions or detected by monitoring the difference between engine-power and throttle rating to modulate the throttle rate command, $TLA\_rate_{CMD}$ 227. The throttle rate command $TLA\_rate_{CMD}$ 227 is an input to the throttle 116.

In summary, employing the above compensation terms, the building block embodied as autothrottle (AT) Inner Loop Control Law 220 generally operates as follows. An error on the potential flight path angle (at 225) is translated at translation block 202 into equivalent flight path acceleration (at 203) and is then converted into a desired delta throttle command, the throttle rate $TLA\_rate_{cmd}$ 227. Notice that the inner loop auto-throttle control law/algorithm data flow 200 remains the same if the target is $a_{FPA}$ (by removing the PFPA to FPA Accel translation block 202) or if the target is a speed rate (by modifying the PFPA to FPA Accel translation block 202 to a Vdot to FPA Accel conversion), because the core of this inner loop auto-throttle control law/algorithm data flow 200 only requires proper conversion of the target to an equivalent flight path acceleration.

Turning now to FIG. 3, concepts from the thrust guidance building block are described. A speed control scheme computes an equivalent true airspeed error 325 between a target airspeed $V_{target}$ 302 and an actual or measured RT airspeed V 304 (either in terms of calibrated airspeed or Mach number, responsive to a pilot selection) and converts the speed error to an equivalent true airspeed error 325. In various embodiments, the intended speed, $V_{target}$ 302, may be manually provided via a user input device 122. In other embodiments, the intended speed $V_{target}$ 302 may be provided by a flight management system (FMS), in communication with a navigation database. The intended speed $V_{target}$ 302 may be obtained from a pre-programmed flight plan (FP); in various embodiments, a flight plan further provides a target speed at each of a series of geospatial midpoints between a takeoff and a landing, and may further include target performance data associated with each of the geospatial midpoints (non-limiting examples of the performance data include target navigation data, such as: target airspeed, target altitude, target acceleration, target flight path angle, and the like).

In various embodiments, the RT airspeed V 304 may be filtered by a filtering 306 module, the filtering being determined based on available on-board sensors to provide appropriate noise rejection.

The equivalent true airspeed error 325 is an input to a control law block labeled Thrust Director (TD) Speed CLAW 320, which includes a conversion of the equivalent true airspeed error 325 into a desired acceleration command 308 and then limiting the desired acceleration command 308 using a pre-programmed acceleration limiter 310. In an embodiment, the pre-programmed acceleration limiter 310 may represent ease/comfort modifications, such as for commercial travel or military use. In an embodiment, the pre-programmed acceleration limiter 310 may be aircraft specific or mission specific. In an embodiment, the pre-programmed acceleration limiter 310 may come from a flight guidance system. In an embodiment, the pre-programmed acceleration limiter 310 may be uploaded and stored in memory 152, as part of the program 162 and stored variables 164. Depending on the embodiment, any one or more may apply: the pre-programmed acceleration limiter 310 can be modified per application, can be modified to employ variable acceleration limiting at different parts of the speed envelope, and can be modified to employ variable acceleration limiting based on flight phase. In an embodiment, the pre-programmed acceleration limiter 310 can be modified by each of: per application; to employ variable acceleration limiting at different parts of the speed envelope; and, to employ variable acceleration limiting based on a flight phase. In an embodiment, the pre-programmed acceleration limiter 310 can be based on available energy, as described herein. A thrust director cue on a displayed image 22 may be updated to show Thrust Director (TD) Speed CLAW 320 output.

After the pre-programmed acceleration limiter 310 process, which generates an acceleration output, the acceleration is translated into a delta flight path angle (distinguished herein as tFPA) at a process 312. The control module 104 modifies the tFPA by adding (at summing junction 322) the tFPA to a reference FPA 324 to obtain an unlimited potential flight path acceleration command. In various embodiments, this summing junction 322 output is the previously mentioned $PFPA_{CMD}$ 52 and may be displayed on a primary flight display. The target or reference FPA, rFPA 324 can be determined based on a coupling status to the AP/autoflight system and can be set to be each of: an FPA command from the autoflight system, a filtered FPA, or a raw FPA.

In other embodiments, prior to displaying this potential flight path command $PFPA_{CMD}$ 52, the summing junction 322 output may be bounded by the available acceleration provided by acceleration limiter 314, such as the PPFPA limits, and may be filtered through display filtering 316 to reduce jitter, etc., and to improve the pilot handling quality of a displayed thrust director cue.

Turning now to FIGS. 4-7, a flight control system on an aircraft for receiving and processing a target airspeed and a vertical target to automatically manage energy by coordinating active targets for each of an autoflight function and an autothrust function to maintain the target airspeed V302 is described, offering coordination between the autothrust function and the autoflight function. In FIGS. 4-7, a novel Auto-FPA function is described that has an Auto-FPA control law that leverages the two control law (CLAW) blocks described in FIG. 2 and FIG. 3, those being: (1) AT Inner loop CLAW 220, which receives the PFPA error 225 and outputs a $TLA\_rate_{CMD}$ 227; and, (2) TD Speed CLAW 320, which receives equivalent true airspeed error 325 and outputs tFPA, and also performs, on tFPA, acceleration limiting (acceleration limiter 314) and display filtering 316 to generate the output $PFPA_{CMD}$ 52. In various embodiments, the rFPA 324 and the $PFPA_{CMD}$ 52 are presented on a primary flight display or other display system 120 in the aircraft 100.

Figure 4:
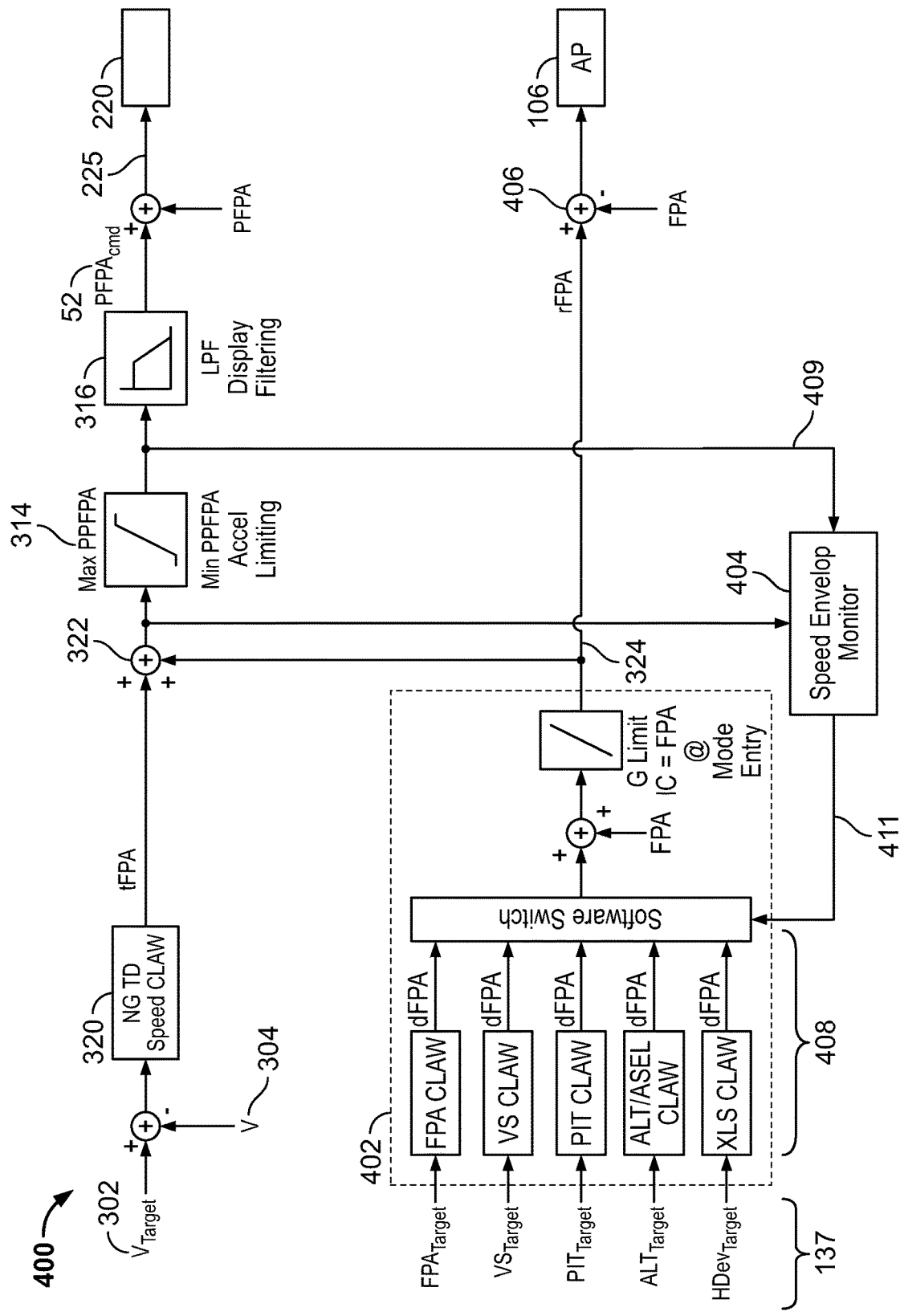
FIG. 4 is a process flow diagram for speed-on-throttle modes, in accordance with an exemplary embodiment.

In FIG. 4, coordination between autothrust and autoflight during speed-on-throttle modes (i.e., thrust modes) to manage available energy is described. The control mode inputs 136 can represent a vertical target that can be used in conjunction with the target airspeed Vtarget 302. Responsive to the control mode inputs 136, the autoflight mode selector block 402 generates a respective vertical target 137 for various different control laws 408 based on the aircraft-specific needs of the aircraft and the vertical maneuver requested, i.e., Flight Path Angle (FPA) control, Vertical Speed (VS) control, Pitch (PIT) control, Altitude (ALT/ASEL) control or Height Deviation (HDeS). Within the autoflight mode selector block 402, each of the vertical targets 137 has a specific control law 408 associated therewith to generate a respective delta FPA, dFPA signal at 408. Specifically, for each vertical target 137 of a plurality of vertical targets 137, there is a respective associated control law which generates a respective associated dFPA, such that the number of vertical targets 137 is equal to the number of respective dFPAs. A software switch in the autoflight mode selector block 402 is configured to pick the appropriate dFPA for comparing to a real time FPA and generating a reference FPA (rFPA 324).

The output of the autoflight mode selector block 402 is the reference flight path angle, rFPA 324. The rFPA 324 is summed with the sensed RT FPA at summing junction 406, the summed output is provided to the autopilot 106.

With reference back to FIG. 3, the rFPA 324 is also used at summing junction 322 to modify the tFPA output from the TD Speed CLAW 320. In various embodiments, the output of the summing junction 322 is subjected to display filtering 316 to generate the output $PFPA_{CMD}$ 52. In various embodiments, acceleration limiting (acceleration limiter 314) is performed on the output of the summing junction 322 prior to the display filtering 316 to generate the output $PFPA_{CMD}$ 52.

In various embodiments, using an acceleration limiter 314 that is based on available energy, the output of the summing junction 322 and the acceleration limited output 409 (each from the TD Speed CLAW 320) may be inputs to a speed envelope monitor 404. The acceleration limited output 409 provides a trigger to the speed envelope monitor 404. The speed envelope monitor 404 may process acceleration limited output 409 to generate output 411. Output 411 may include corrective actions that may be inputs to the autoflight mode selector block 402, and in particular, to the software switch therein In an example, the corrective actions embodied in output 411 may enable the system 102 to maintain the aircraft 100 in a speed-on-thrust control mode. These corrective actions vary based on the mode that is active and can take each of the following forms: automatically updating the target (wherein the target may be an airspeed, altitude, flight path angle, or the like); performing an automatic transition to a speed control mode; request engagement of the Autopilot; request other external speed protection mechanisms; and, triggering annunciation alerts to alert the pilot and request a pilot correction.

In various embodiments, other speed protection mechanisms may include generating tactile feedback on the pilot controls (including but not limited to the user input devices) and generating/communicating to an external unit, such as a Fly-By-Wire computer, an alert that an action needs to be taken.

Summarizing concepts from FIGS. 1-4, a flight control system 102 is provided on an aircraft having an autoflight (for example, for the autopilot 106) and autothrust system. The flight control system 102 performs the functions of receiving and processing a target airspeed Vtarget 302 and autoflight control mode inputs 136 to automatically manage energy by coordinating autoflight targets and autothrust system 118 commands, the system comprising a control module 104 with a processor 150 configured by programming instructions on non-transient computer readable media 152, the control module 104 being configured to: receive a potential flight path angle target (tFPA) from the autothrust system that is based on the Vtarget 302; receive a vertical target from the autoflight system (rFPA) that is based on the autoflight control mode inputs, the autoflight control mode inputs including a mode selection; generate a potential flight path angle command (PFPAcmd) for use as an active autothrust command based on the rFPA and tFPA; generate an FPA command (FPAcmd) for use as the active autoflight target based on the rFPA; and present the rFPA and the PFPAcmd on a primary flight display.

In various system 102 embodiments, a speed envelop monitor 404 is coupled across the acceleration limiter 314, and configured to determine whether a given PFPAcmd 52 exceeds the PPFPA limits. The control module 104 can be further configured to: update the rFPA 324 to thereby maintain the autothrust system in a speed-on-throttle mode when the PFPAcmd 52 does not exceed the PPFPA limits; and display filter the modification of the rFPA 324 with the tFPA (the modification being the output from summing junction 322) prior to generating the potential flight path angle command (PFPAcmd 52). In some embodiments, the rFPA is further responsive to a control (output 411) from a speed envelope monitor 404.

In some embodiments, the control module is further configured to receive a user input requesting a climb or descent and activate an auto-FPA mode responsive to the requested climb or descent. The system 102 can utilize a minimum predicted potential flight path angle (min PPFPA) or a maximum predicted potential flight path angle (max PPFPA) as the rFPA, based on the climb or descent request; and generate the flight path angle command (PFPAcmd 52) further based on the rFPA, the tFPA, and either the min PPFPA or the max PPFPA.

In some embodiments, the control module 104 is further configured to modify the rFPA 324 with a scaling factor to provide a margin for bi-directional speed-on-throttle control during the climb or descent.

Additionally, the system 102 employs the auto-FPA control law that is configured to control speed-controlled climbs and descents, thereby replacing the speed-on-elevator modes, such as Speed Hold (SPD) and Flight Level Change (FLCH). Instead of implementing only a closed-loop speed controller that translates speed error and/or speed rate error targets into either a desired flight path angle (FPA) or elevator deflection (such as provided by the speed envelope monitor 404), the auto-FPA control law performs additional functions as described herein. The auto-FPA control law relies on flight path angle (FPA) related signals from the acceleration limiter 314 to determine the maximum allowable flight path angle that maintains speed-on-throttle control. Output from the auto-FPA control law includes a $PFPA_{cmd}$ 52 and an rFPA 324, each of which are used by display system 120.

FIG. 5 provides a process flow diagram 500 of an exemplary implementation of the Auto-FPA control law configured for a fixed thrust mode. In practice, FIG. 5 relates to the experience of maintaining speed while climbing or descending, responsive to a user request for a climb or a descent. In response to autoflight mode engagement (with reference back to FIGS. 1 and 4, a user input request at mode selection by control mode inputs 136 signal an altitude target for the climb or descent, and the autoflight mode selector 134 generates therefrom ALTtarget). Block 502 includes algorithms and processes as follows: a PPFPA algorithm, operating on input from the IRS 132 and engine 130, outputs a minimum PPFPA and a maximum PPFPA; the Auto-FPA control law determines whether a climb or descent is being requested based on an altitude difference between an RT altitude and the ALTtarget. The climb or descent determination is used to determine whether the min or max PPFPA is used as the target PFPA for the climb/descent.

A scaling factor process provides a scaling factor 510 that enables modification of a target PFPA to provide a margin for bi-directional speed-on-throttle control during the climb/descent. For example, energy can be maintained as follows: using 100% scaling factor on a climb would mean that a speed decrease could be handled by a transient throttle adjustment only, whereas a speed increase would require a flight path transient to capture the new target airspeed. Using a smaller scaling factor, the Auto-FPA function provides a blended system in which the PFPA and FPA are blended to generate autothrottle 116 and AP 106 controls, as depicted in FIG. 4. The auto-FPA function can control speed bi-directionally with the throttles during a climb/descent, with the speed range determined by the scaling factor. This minimizes transients on generated reference FPA (rFPA 324) during speed changes and during temperature changes and when flying in turbulence.

In specific scenarios, such as escape guidance or an emergency descent, a maximum performance has a higher priority than passenger comfort. In these scenarios, the pilot wants to fly at a maximum power; this configuration is shown in FIG. 6, which illustrates how the auto-FPA control law can also be configured to mimic speed-on-elevator behavior. For speed-on-elevator behavior, the speed targets are controlled by the flight path angle command $PFPA_{CMD}$ 52. FIG. 6 process flow diagram 600 shows the energy managed autoflight guidance Auto-FPA control law configured for Flight Level Change commands, to mimic speed-on-elevator behavior.

In the data flow block 602, similar to FIG. 5 block 502, the PPFPA algorithm is still used in the determination of the reference FPA, rFPA 324, used for generation of $PFPA_{CMD}$ 52 for autothrottle control of the throttle 116, (via AT Inner Loop CLAW 220), but different from FIG. 5, the speed target effects manifested in the tFPA are not utilized in generation of the PFPAcmd 52, but are only used in the commands to the autopilot 106. Therefore, the thrust changes are solely controlled via flight path angle (FPA) corrections (e.g., by the output of summation junction 406). By following the command from the PFPA Thrust Director, the control law illustrated in flow diagram 600 can limit the acceleration towards a given target airspeed $V_{target}$ 302, which is an improvement over available flight guidance mode offering. Therefore, the Auto-FPA control law provides a smoother climb/descent by minimizing flight path transients, but it can also generate throttle and thrust commands that result in maximum performance climb/descents.

Available Autoflight functions and Autothrust functions provide different, generally independent, methods for speed protection (also referred to as speed envelope protection). These methods can be combined if the aircraft contains both autoflight and autothrust. On the autothrust, the typical means to prevent speed violations is to bound the speed target selection to the speed envelope, and in other cases to auto-engage the throttles when a speed violation is detected while the autothrottle is disengaged. On the autoflight, the typical means of speed envelope protection is to transition the active vertical mode into a speed-on-elevator mode, such that the vertical target is adjusted to maintain the aircraft inside the speed envelope. On aircraft equipped with both autothrust and autoflight systems, such as autopilot 106, the activation of the speed protection mechanisms are set up such that the autothrust has enough time to correct the speed violation prior to activating the speed protection from the autoflight, and in the case that the autoflight speed protection is activated, the autothrust goes into thrust mode by setting the throttle in the location to maximum arrest the violation.

While these methods provide adequate speed protection capability to the aircraft 100, in many cases the resulting corrections by the autothrust and autoflight are not optimal or intuitive and can cause abrupt changes in both the throttle position and the vertical path. For example, the lack of coordination of the autothrust and autoflight systems when both are available can result in unnecessary transients of both control axis that could be otherwise avoided by a coordinated reaction, like the reaction that would be expected by an experienced pilot. Therefore, the provided energy managed flight control system 102 coordinates not only engagement of the speed protection mechanisms of both thrust and vertical axis, but also the amount of contribution by each axis.

Figure 7:
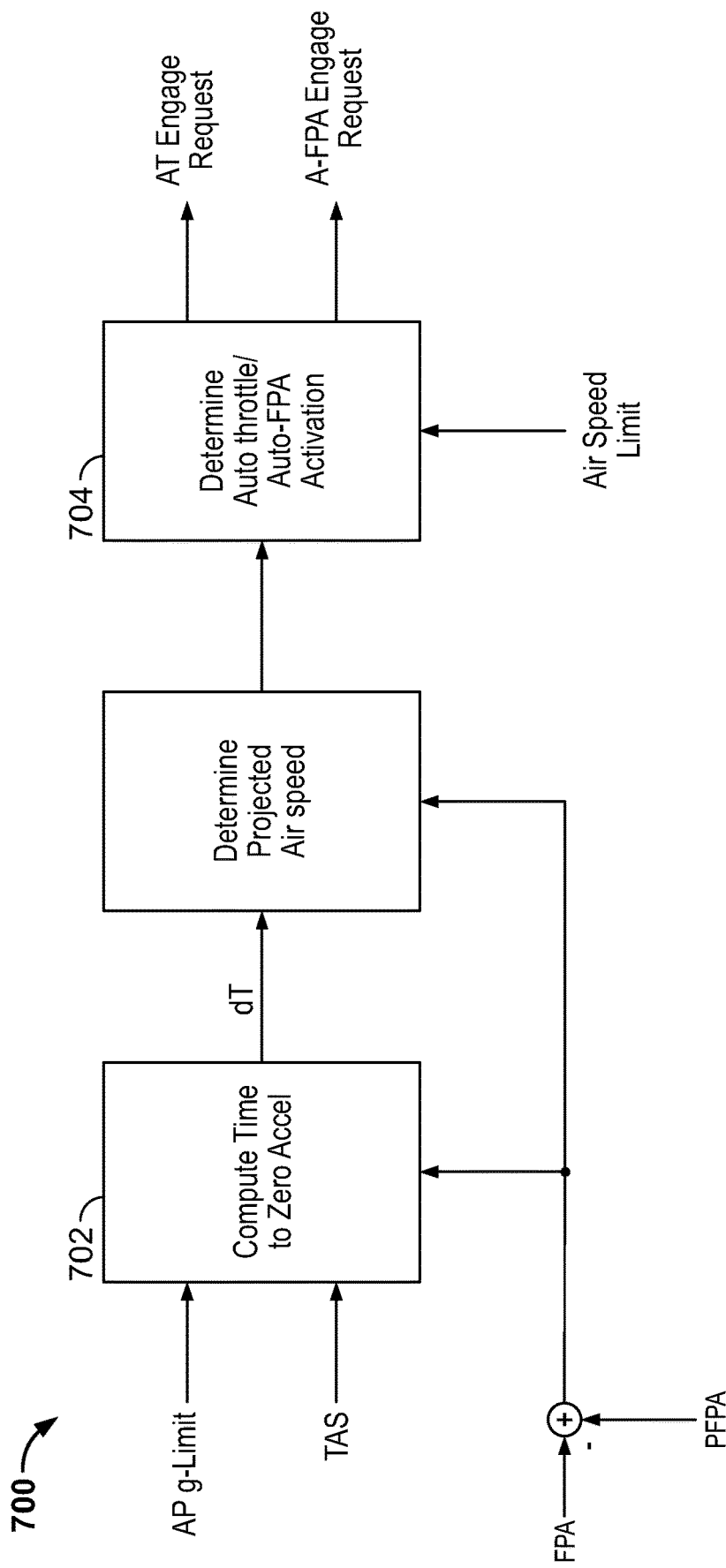
FIG. 7 is a process flow diagram showing speed protection, in accordance with an exemplary embodiment.

By using the FPA and PFPA relationship, a simpler and more intuitive means of detecting and coordinating speed protection maneuvers is proposed. As the aircraft accelerates or decelerates in a direction that would violate the speed envelope, the opposing acceleration or deceleration required by the system to arrest the violation is the difference between the current FPA and the PFPA. Furthermore, by knowing the Idle PPFPA and Max PPFPA of the aircraft, the proposed speed protection function is capable of determining whether the engine has sufficient energy to avoid the speed violation and the proper activation time such that an asymptotic capture of the target limit speed is achieved. FIG. 7 shows the block diagram of the speed protection activation scheme.

In various system 102 embodiments, as shown in FIG. 7, the speed envelop monitor 404 is further configured to: predict a time to zero acceleration based on maintaining the aircraft inside an existing aircraft speed envelope limit; and based on the time to zero acceleration, (i) request activation of the autothrust when it is not activated, and (ii) request activation of an auto-FPA mode when it is not engaged. Predicting the time to zero acceleration may be performed at a module 702, based on an aircraft specific G-Limit of the autopilot 106 and a true airspeed (TAS) input, for example. In various embodiments, the speed envelop monitor 404 is further configured to: predict a time to zero acceleration based on maintaining the aircraft inside an existing aircraft speed envelope limit; and based on the time to zero acceleration, (i) request activation of the autothrust when it is not activated, (ii) request activation of an auto-FPA mode when it is not engaged, and (iii) request engagement of the autopilot if not engaged or to drive other external speed protection mechanisms.

FIG. 7 provides a process flow diagram of an algorithm for the speed envelop monitor 404. FIG. 7 is an embodiment of a speed protection activation scheme 700 employed by the Auto-FPA function. The energy management illustrated in scheme 700 uses the predictive potential flight path (PPFPA). The scheme shown in FIG. 7 can be used to determine (at 704) (1) the activation of the Autothrottle function if they were not engaged/active, and (2) the activation of the Auto-FPA mode if the autothrottle function was already engaged or does not have sufficient energy to prevent a speed violation. The difference between (1) and (2) is a function of a predicted time to achieve zero acceleration 702. In various embodiments, the speed envelope monitor 404, at 704, can request engagement of the autopilot 106 if not engaged and/or drive other external speed protection mechanisms.

The control module 104 predicts the time to zero acceleration at 702. The time to zero acceleration varies between the autothrust and the autoflight because the time to zero acceleration projection for the autothrust takes into account the acceleration capability of the engine, while the time to zero acceleration projection for auto-FPA mode activation is a function of an aircraft specific G-Limit of the autopilot 106 to equalize FPA and PFPA. In the cases where the autothrottle 116 is capable of fully preventing a speed violation, the autothrottles 116 are engaged and driven to the current flight path angle at maximum throttle setting before continuing on to respond to an existing thrust 118 director command. In the case that the autoflight speed protection needs activation, auto FPA mode is selected automatically, and auto FPA mode automatically guides the throttle movement and the flight path angle location in a coordinated path to avoid the speed violation.

Accordingly, the exemplary embodiments discussed above provide systems and methods for energy managed autoflight guidance using potential flight path angle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A flight control system on an aircraft having an autoflight and autothrust system for receiving and processing a target airspeed and autoflight control mode inputs to automatically manage energy by coordinating autoflight target and autothrust system commands, the system comprising a speed envelope monitor and a control module, the control module including a processor configured by programming instructions on non-transient computer readable media, the control module configured to:
    receive a potential flight path angle target (tFPA) from the autothrust system that is based on the target airspeed;
    receive a vertical target from the autoflight system (rFPA) that is based on the autoflight control mode inputs, the autoflight control mode inputs including a mode selection;
    generate a potential flight path angle command (PFPAcmd) for use as an active autothrust command based on the rFPA and tFPA;
    generate an FPA command (FPAcmd) for use as the active autoflight target based on the rFPA; and
    present the rFPA and the PFPAcmd on a primary flight display;
the speed envelope monitor configured to:
    predict a time to zero acceleration based on maintaining the aircraft inside an existing aircraft speed envelope limit; and
    based on the time to zero acceleration, (i) request activation of the autothrust when it is not activated, (ii) request activation of an auto-FPA mode when it is not active, and (iii) request auto-pilot activation when it is not active.

2. The flight control system of claim 1, wherein the control module is further configured to display filter the rFPA prior to generating the potential flight path angle command (PFPAcmd).

3. The flight control system of claim 1, wherein the control module is further configured to:
    generate the flight path angle command (FPAcmd) further as a modification of the rFPA with the tFPA, thereby activating an auto-FPA mode; and
    display filter the modification of the rFPA with the tFPA prior to generating the potential flight path angle command (PFPAcmd).

4. The flight control system of claim 1, wherein the control module is further configured to:

perform acceleration limiting on the modification of the rFPA with the tFPA prior to performing the display filter, the acceleration limiting being based on available energy, wherein the available energy is represented by predicted potential flight path angle (PPFPA) limits.

5. The flight control system of claim 4, further comprising a speed envelop monitor configured to determine whether the PFPAcmd exceeds the PPFPA limits; and
wherein the control module is further configured to:
update the rFPA to thereby maintain the autothrust system in a speed-on-throttle mode when the PFPAcmd does not exceed the PPFPA limits;
and
display filter a modification of the updated rFPA with the tFPA prior to generating the potential flight path angle command (PFPAcmd).

6. The flight control system of claim 1, wherein the control module is further configured to:
receive a user input requesting a climb or descent;
activate an auto-FPA mode responsive to the requested climb or descent;
utilize a minimum predicted potential flight path angle (min PPFPA) or a maximum predicted potential flight path angle (max PPFPA) as the rFPA, based on the climb or descent request; and
generate the flight path angle command (FPAcmd) further based on the rFPA, the tFPA, and either the min PPFPA or the max PPFPA.

7. The flight control system of claim 6, wherein the control module is further configured to modify the rFPA with a scaling factor to provide a margin for bi-directional speed-on-throttle control during the climb or descent.

8. The flight control system of claim 7, wherein the scaling factor is less than 100% and the control module, in an auto-FPA mode, generates commands for autothrottle and autopilot based on blending the PFPA and FPA.

9. The flight control system of claim 8, wherein the control module, in auto-FPA mode, determines a speed range for the aircraft based on the scaling factor.

10. A method for energy managed flight control on an aircraft having an autoflight and autothrust system, the method comprising:
receiving a target airspeed and autoflight control mode inputs including a mode selection;
receiving a potential flight path angle target (tFPA) from the autothrust system that is based on the target airspeed;
receiving a vertical target from the autoflight system (rFPA) that is based on the autoflight control mode inputs;
generate a potential flight path angle command (PFPAcmd) for use as an active autothrust command based on the rFPA and tFPA;
generate an FPA command (FPAcmd) for use as the active autoflight target based on the rFPA;
present the rFPA and the PFPAcmd on a primary flight display;
predicting, by a speed envelope monitor, a time to zero acceleration based on maintaining the aircraft inside an existing aircraft speed envelope limit; and
based on the time to zero acceleration, (i) requesting activation of the autothrust when it is not activated, (ii) request activation of an auto-FPA mode when it is not active, (iii) request auto-pilot activation when it is not active, and (iv) request other speed protection mechanisms.

11. The method of claim 10, further comprising display filtering the rFPA prior to generating the potential flight path angle command (PFPAcmd).

12. The method of claim 10, further comprising:
generating the flight path angle command (FPAcmd) further as a modification of the rFPA with the tFPA, thereby activating an auto-FPA mode; and
display filtering the modification of the rFPA with the tFPA prior to generating the potential flight path angle command (PFPAcmd).

13. The method of claim 10, further comprising:
performing acceleration limiting on the modification of the rFPA with the tFPA prior to performing the display filtering; wherein
the acceleration limiting is based on available energy, represented by predicted potential flight path angle (PPFPA) limits.

14. The method of claim 13, further comprising:
determining, at a speed envelope monitor, whether the PFPAcmd exceeds the PPFPA limits; and
updating the rFPA to thereby maintain the autothrust system in a speed-on-throttle mode when the PFPAcmd does not exceed the PPFPA limits;
and
display filtering a modification of the updated rFPA with the tFPA prior to generating the potential flight path angle command (PFPAcmd).

15. The method of claim 10, further comprising:
receiving a user input requesting a climb or descent;
activating an auto-FPA mode responsive to the requested climb or descent;
utilizing a minimum predicted potential flight path angle (min PPFPA) or a maximum predicted potential flight path angle (max PPFPA) as the rFPA, based on the climb or descent request; and
generating the flight path angle command (FPAcmd) further based on the rFPA, the tFPA, and either the min PPFPA or the max PPFPA.

16. The method of claim 15, further comprising: modifying the rFPA with a scaling factor to provide a margin for bi-directional speed-on-throttle control during the climb or descent.

17. The method of claim 16, further comprising:
activating auto-FPA mode when the scaling factor is less than 100%; and
generating commands for autothrottle and autopilot based on blending the PFPA and FPA.

18. The method of claim 17, further comprising determining a speed range for the aircraft based on the scaling factor.

19. A flight control system on an aircraft having an autoflight and autothrust system for receiving and processing a target airspeed and autoflight control mode inputs to automatically manage energy by coordinating autoflight target and autothrust system commands, the system comprising a control module with a processor configured by programming instructions on non-transient computer readable media, the control module configured to:
receive a potential flight path angle target (tFPA) from the autothrust system that is based on the target airspeed;
receive a vertical target from the autoflight system (rFPA) that is based on the autoflight control mode inputs, the autoflight control mode inputs including a mode selection;
generate a potential flight path angle command (PFPAcmd) for use as an active autothrust command based on the rFPA and tFPA;

generate an FPA command (FPAcmd) for use as the active autoflight target based on the rFPA;
present the rFPA and the PFPAcmd on a primary flight display;
receive a user input requesting a climb or descent;
activate an auto-FPA mode responsive to the requested climb or descent;
utilize a minimum predicted potential flight path angle (min PPFPA) or a maximum predicted potential flight path angle (max PPFPA) as the rFPA, based on the climb or descent request; and
generate the flight path angle command (FPAcmd) further based on the rFPA, the tFPA, and either the min PPFPA or the max PPFPA.

\* \* \* \* \*